(12) United States Patent
Zhang et al.

(10) Patent No.: US 8,704,761 B2
(45) Date of Patent: Apr. 22, 2014

(54) INPUT METHOD EDITOR

(75) Inventors: Guangqiang Zhang, Beijing (CN); Mojun Wang, Beijing (CN); Genqing Wu, Beijing (CN); Tai-Yi Huang, Bellevue, WA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 13/141,060

(22) PCT Filed: Mar. 19, 2009

(86) PCT No.: PCT/CN2009/070888
§ 371 (c)(1),
(2), (4) Date: Jun. 20, 2011

(87) PCT Pub. No.: WO2010/105427
PCT Pub. Date: Sep. 23, 2010

(65) Prior Publication Data
US 2011/0316772 A1      Dec. 29, 2011

(51) Int. Cl.
| | |
|---|---|
| G09G 5/00 | (2006.01) |
| G06F 3/041 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.
USPC ............................ 345/156; 345/173; 715/259

(58) Field of Classification Search
None
See application file for complete search history.

(56) References Cited

U.S. PATENT DOCUMENTS

| 5,835,635 | A | | 11/1998 | Nozaki et al. | |
|---|---|---|---|---|---|
| 5,862,256 | A | * | 1/1999 | Zetts et al. | ..................... 382/187 |
| 5,896,321 | A | * | 4/1999 | Miller et al. | ............. 365/189.15 |
| 5,953,541 | A | * | 9/1999 | King et al. | ...................... 710/67 |

(Continued)

FOREIGN PATENT DOCUMENTS

| CN | 1406374 A | 3/2003 |
|---|---|---|
| CN | 1581041 A | 2/2005 |

(Continued)

OTHER PUBLICATIONS

PCT International Search Report and Written Opinion for International Application No. PCT/CN2009/070888 dated Dec. 24, 2009 (9 pages).

(Continued)

*Primary Examiner* — Nicholas Lee
(74) *Attorney, Agent, or Firm* — Remarck Law Group PLC (57) ABSTRACT

Methods, systems, and apparatus, including computer program products, in which an input method editor receives input in a first writing system and presents input candidates in the first writing system or a second writing system. In one implementation, a method is provided. The method includes receiving input in a first writing system; presenting the input in the first writing system in a first interface element of an interface as content input; automatically identifying one or more candidates in a second writing system based on the input in the first writing system; and presenting the one or more candidates in the second writing system in a second interface element that is separate from the first interface element.

20 Claims, 6 Drawing Sheets

(56) References Cited

U.S. PATENT DOCUMENTS

| | | |
|---|---|---|
| 6,204,848 B1 | 3/2001 | Nowlan et al. |
| 6,346,894 B1 | 2/2002 | Connolly et al. |
| 6,822,585 B1 * | 11/2004 | Ni et al. .................. 341/28 |
| 7,107,204 B1 * | 9/2006 | Liu et al. .................. 704/2 |
| 7,385,531 B2 | 6/2008 | Zhang |
| 2002/0196163 A1 | 12/2002 | Bradford et al. |
| 2009/0225041 A1 * | 9/2009 | Kida et al. ............... 345/173 |
| 2010/0169770 A1 | 7/2010 | Hong et al. |

FOREIGN PATENT DOCUMENTS

| | | |
|---|---|---|
| CN | 1643484 A | 7/2005 |
| CN | 1783066 A | 6/2006 |
| CN | 1851624 A | 10/2006 |
| CN | 1854998 A | 11/2006 |
| CN | 1908863 A | 2/2007 |
| CN | 101286092 A | 10/2008 |
| CN | 101369209 A | 2/2009 |
| JP | S5998236 A | 6/1984 |
| JP | H0896085 A | 4/1996 |
| JP | H1039894 A | 2/1998 |
| JP | H11338858 A | 12/1999 |
| JP | 2000268039 A | 9/2000 |
| JP | 2001312294 A | 11/2001 |
| JP | 2002007042 A | 1/2002 |
| JP | 2002518721 A | 6/2002 |
| JP | 2005530272 A | 10/2005 |
| JP | 2008250378 A | 10/2008 |
| WO | 9965212 A | 12/1999 |
| WO | 0148737 A | 7/2001 |
| WO | 2004001979 A | 12/2003 |

OTHER PUBLICATIONS

PCT International Search Report and Written Opinion for International Application No. PCT/CN2009/070889 dated Nov. 19, 2009 (8 pages).

* cited by examiner

INPUT METHOD EDITOR

BACKGROUND

This specification relates to input methods.

A writing system uses symbols (e.g., characters or graphemes) to represent sounds of a language. A collection of symbols in a writing system can be referred to as a script. For example, a Latin writing system, including a collection of Roman characters in one or more Roman scripts, can be used to represent the English language. The Latin writing system can include blocked Roman characters (e.g., capitalized character "B"), typed Roman characters (e.g., plain character "b"), and cursive Roman characters (e.g., cursive character "b"). Each visual representation of the character "b" represents the same grapheme in the Latin writing system.

As another example, the Chinese language can be represented by more than one writing system. For example, the Chinese language can be represented by a first writing system, e.g., Pinyin (or Romanized Chinese). As another example, the Chinese language can be represented using a second writing system, e.g., Bopomofo or Zhuyin Fuhao ("Zhuyin"). As yet another example, the Chinese language can be represented using a third writing system, e.g., Hanzi. In particular, Pinyin and Zhuyin are phonetic systems for representing Hanzi characters.

Languages that use logographic writing systems in which one or more symbols, e.g., characters, correspond roughly to one word or meaning have more characters than keys on a standard input device, such as a computer keyboard on a mobile device keypad. An input method editor, however, facilitates the use of computer keyboards to input characters in these writing systems. For example, an input method editor can take Roman character inputs in the Pinyin writing system and map the inputs to the many Hanzi characters of the Chinese language. Accordingly, a keyboard designed for input in a first writing system can be used to input text in a second writing system, e.g., a keyboard for Roman scripts (e.g., a QWERTY keyboard) can be used to input Chinese, Japanese, or Korean characters.

Often a user of a device implementing an input method editor may desire to switch between languages, e.g., from Chinese to English or from English to Chinese, or input text in one writing system using another writing system, e.g., input Hanzi-Chinese using Bopomofo-Chinese. As an amount of user input or interaction that is needed to select a particular language or writing system (e.g., switch between modes) increases, an ease of using the input method editor may decrease.

SUMMARY

This specification describes technologies relating to input methods.

In general, one aspect of the subject matter described in this specification can be embodied in methods that include the actions of receiving input in a first writing system; presenting the input in the first writing system in a first interface element of an interface as content input, where the first interface element is a default interface element for presenting the input and a default entry command of the first interface element copies the input into a target location in the interface; automatically identifying one or more candidates in a second writing system based on the input in the first writing system; and presenting the one or more candidates in the second writing system in a second interface element that is separate from the first interface element, where a first candidate in the second writing system is copied into the target location subsequent to a corresponding selection of one of the one or more candidates in the second interface element. Other embodiments of this aspect include corresponding systems, apparatus, and computer program products.

These and other embodiments can optionally include one or more of the following features. The corresponding selection is a user selection of the first candidate. The one or more candidates in the second writing system include translations, transliterations, or phonetic representations of the input in the first writing system. The method further includes calculating a temporal length of the input, the temporal length representing a duration of actuation of an input device corresponding to the input; comparing the temporal length of the input to a threshold value; and identifying the input as representative of content input in the second writing based on the comparison. The first writing system is Pinyin and the second writing system is Hanzi.

In general, another aspect of the subject matter described in this specification can be embodied in methods that include the actions of detecting a current input to an interface; calculating a temporal length of the current input, the temporal length representing a duration of actuation of an input device corresponding to the current input; comparing the temporal length of the current input to a threshold value; identifying the current input as content input in a first writing system if the temporal length is greater than or equal to the threshold value, or as representative of content input in a second writing system if the temporal length is less than the threshold value; copying the current input into a target location in the interface, if the current input is identified as content input in the first writing system; and identifying one or more candidates in the second writing system based on the current input in the first writing system, for display in the interface, if the current input is identified as representative of content input in the second writing system. Other embodiments of this aspect include corresponding systems, apparatus, and computer program products.

These and other embodiments can optionally include one or more of the following features. Identifying one or more candidates in the second writing system includes generating the one or more candidates in the second writing system based on the current input and previous input representative of content input in the second writing system. The current input is received through a virtual input device. The first writing system is Pinyin and the second writing system is Hanzi.

In general, another aspect of the subject matter described in this specification can be embodied in systems that include a data processing apparatus; and a data store, in which is stored: a detection engine including an input module that detects input received through an interface of the data processing apparatus, where the input is in a first writing system; and an input method editor that presents the input in the first writing system in a first interface element of the interface as content input, and automatically identifies one or more candidates in a second writing system, based on the input in the first writing system, for display in a second interface element that is separate from the first interface element. Other embodiments of this aspect include corresponding methods, apparatus, and computer program products.

These and other embodiments can optionally include one or more of the following features. The first interface element is a default interface element for presenting the input and a default entry command of the first interface element copies the input into a target location in the interface, and a first candidate in the second writing system is copied into the target location subsequent to a corresponding selection of one of the one or more candidates in the second interface element. The detection engine further includes a timing module that calculates a temporal length of the input, the temporal length representing a duration of actuation of an input device corresponding to the input. The input module identifies the input as content input in the first writing system or representative of content input in the second writing system based on the temporal length of the input. The first writing system is Pinyin and the second writing system is Hanzi.

In general, another aspect of the subject matter described in this specification can be embodied in systems that include a data processing apparatus; and a data store, in which is stored: a detection engine including an input module that detects input received through an interface of the data processing apparatus, where the input is in a first writing system, and a timing module that calculates a temporal length of the input, the temporal length representing a duration of actuation of an input device corresponding to the input; and an input method editor that identifies the input as content input in a first writing system if the temporal length is greater than or equal to a threshold value, or as representative of content input in a second writing system if the temporal length is less than the threshold value, for display in a target location in the interface. Other embodiments of this aspect include corresponding methods, apparatus, and computer program products.

These and other embodiments can optionally include one or more of the following features. The data store further stores a language model that identifies one or more candidates in the second writing system based on the input in the first writing system, for display in the target location, if the input is identified as representative of content input in the second writing system. The first writing system is Pinyin and the second writing system is Hanzi.

Particular embodiments of the subject matter described in this specification can be implemented to realize one or more of the following advantages. Using separate interface elements to present input in a first writing system and one or more candidates in a second writing system decreases an amount of user input and interaction needed to switch between entering input in the first writing system or the second writing system, thereby increasing a convenience and efficiency of an input method and improving a user's experience.

In addition, using separate interface elements to present input in a first writing system and one or more candidates in a second writing system decreases a number of modes (e.g., distinct input method editor modes for different writing systems) that the user must be familiar with or aware of, thereby decreasing a likelihood of the user selecting an unintended mode and further increasing the convenience and efficiency of the input method and improving the user's experience.

Furthermore, identifying current input as content input in a first writing system or as representative of content input in the second writing system based on a temporal length of the current input (e.g., a duration of actuation of an input device corresponding to the current input) further decreases the amount of user input and interaction needed to switch between entering input in the first writing system or the second writing system, thereby increasing the convenience and efficiency of the input method and improving the user's experience.

Reducing the amount of user input and interaction can be especially useful on mobile devices (e.g., mobile phones) that include smaller keypads or predictive keyboards. For example, reducing the amount of user input and interaction on a smaller keypad also reduces a likelihood of a user selecting an incorrect key, thereby increasing an efficiency and accuracy of the input method.

Reducing the amount of user input and interaction can be especially useful when a user is operating in a multi-task environment (e.g., using a Global Positioning System navigation device while driving) or when the user has limited use of one or both hands for operating a device (e.g., a mobile phone). For example, reducing the amount of user input and interaction in the multi-task environment reduces a likelihood of the user selecting an incorrect key, thereby increasing an efficiency and accuracy of performing multiple tasks (e.g., multi-tasking) and further increasing an efficiency and accuracy of the input method.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
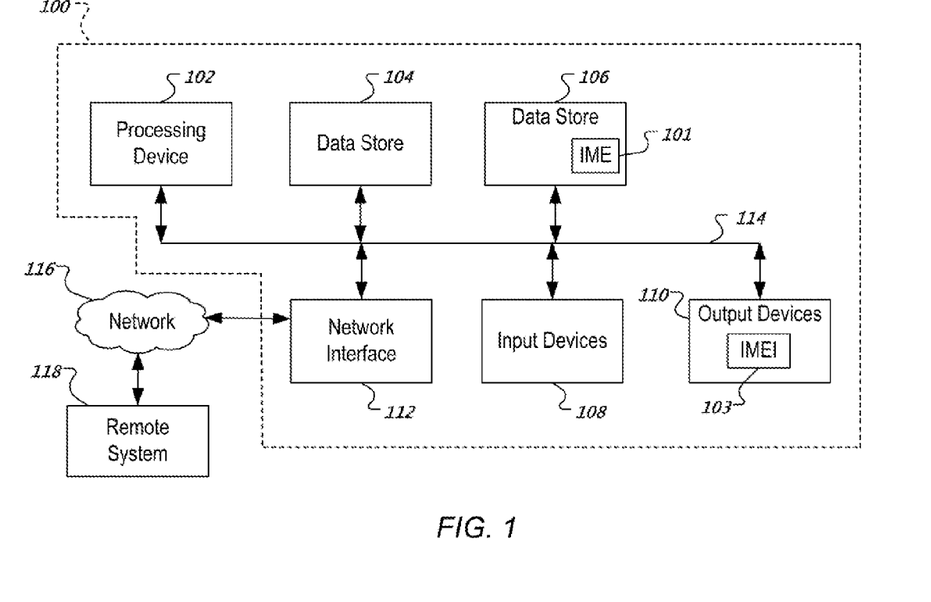
FIG. 1 is a block diagram of an example system that can be utilized to implement the systems and methods described herein.

FIG. 1 is a block diagram of an example system 100 that can be utilized to implement the systems and methods described herein. The example system 100 can, for example, be implemented in a computer device, such as a personal computer device, or other electronic devices, such as a mobile phone, mobile communication device, personal digital assistant (PDA), Global Positioning System (GPS) navigation device, and the like.

The example system 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other system architectures can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, etc., and example output devices 110 can include a display device, an audio device, etc. The network interface 112 can, for example, include a wired or wireless network device operable to communicate data to and from a network 116. The network 116 can include one or more local area networks (LANs), a wide area network (WAN), such as the Internet, a wireless network, such as a cellular network, or a combination of all of the above.

In some implementations, the system 100 can include input method editor (IME) code 101 from a data store, such as the data store 106. The input method editor code 101 can be defined by instructions that upon execution cause the processing device 102 to carry out input method editing functions. The input method editor code 101 can, for example, comprise interpreted instructions, such as script instructions, e.g., JavaScript or ECMAScript instructions, that can be executed in a web browser environment. Other implementations can also be used, e.g., a stand-alone application, an applet, a plug-in module, etc., for use in a user interface, such as a display that displays user inputs received by use of keypad mapping for a mobile device or keyboard mapping for a mobile device or personal computer.

Execution of the input method editor code 101 generates or launches an input method editor instance (IMEI) 103. The input method editor instance 103 facilitates the processing of one or more input methods at the system 100, during which time the system 100 can receive inputs for characters or symbols, such as, for example, Roman characters that represent Pinyin. For example, the user can use one or more of the input devices 108 (e.g., a keyboard, such as a keyboard for Roman scripts, a stylus used with a handwriting recognition engine, etc.) to input Pinyin inputs for identification of Hanzi terms. In some examples, a Hanzi term can be composed of more than one Pinyin input.

The first data store 104 and/or the second data store 106 can store an association of inputs. Based on a user input, the input method editor instance 103 can use information in the data store 104 and/or the data store 106 to identify one or more candidate selections represented by the input. In some implementations, if more than one candidate selection is identified, the candidate selections are displayed on an output device 110. Using the input device 108, the user can select from the candidate selections a Hanzi term, for example, that the user desires to input.

In some implementations, the input method editor instance 103 on the system 100 can receive one or more Pinyin inputs and convert the inputs into Hanzi terms. The input method editor instance 103 can, for example, use compositions of Pinyin syllables (e.g., Roman characters) received from keystrokes to represent the Hanzi terms. Each Roman character can, for example, correspond to a key in the keyboard for Roman scripts. Using a Pinyin input method editor, a user can input a Hanzi term by using inputs that include one or more Pinyin syllables representing the sound of the Hanzi term. Input methods for other languages and writing systems, however, can also be facilitated.

In some implementations, a remote computing system 118 having access to the system 100 can also be used to edit a logographic script. For example, the system 100 may be a server that provides logographic script editing capability via the network 116. In one example, a user can edit a logographic script stored in the data store 104 and/or the data store 106 using a remote computing system, e.g., a client computer. The system 100 can, for example, select a character and receive an input from a user over the network interface 112. The processing device 102 can, for example, identify one or more characters adjacent to the selected character, and identify one or more candidate selections based on the received input and the adjacent characters. The system 100 can transmit a data communication that includes the candidate selections back to the remote computing system.

Figure 2:
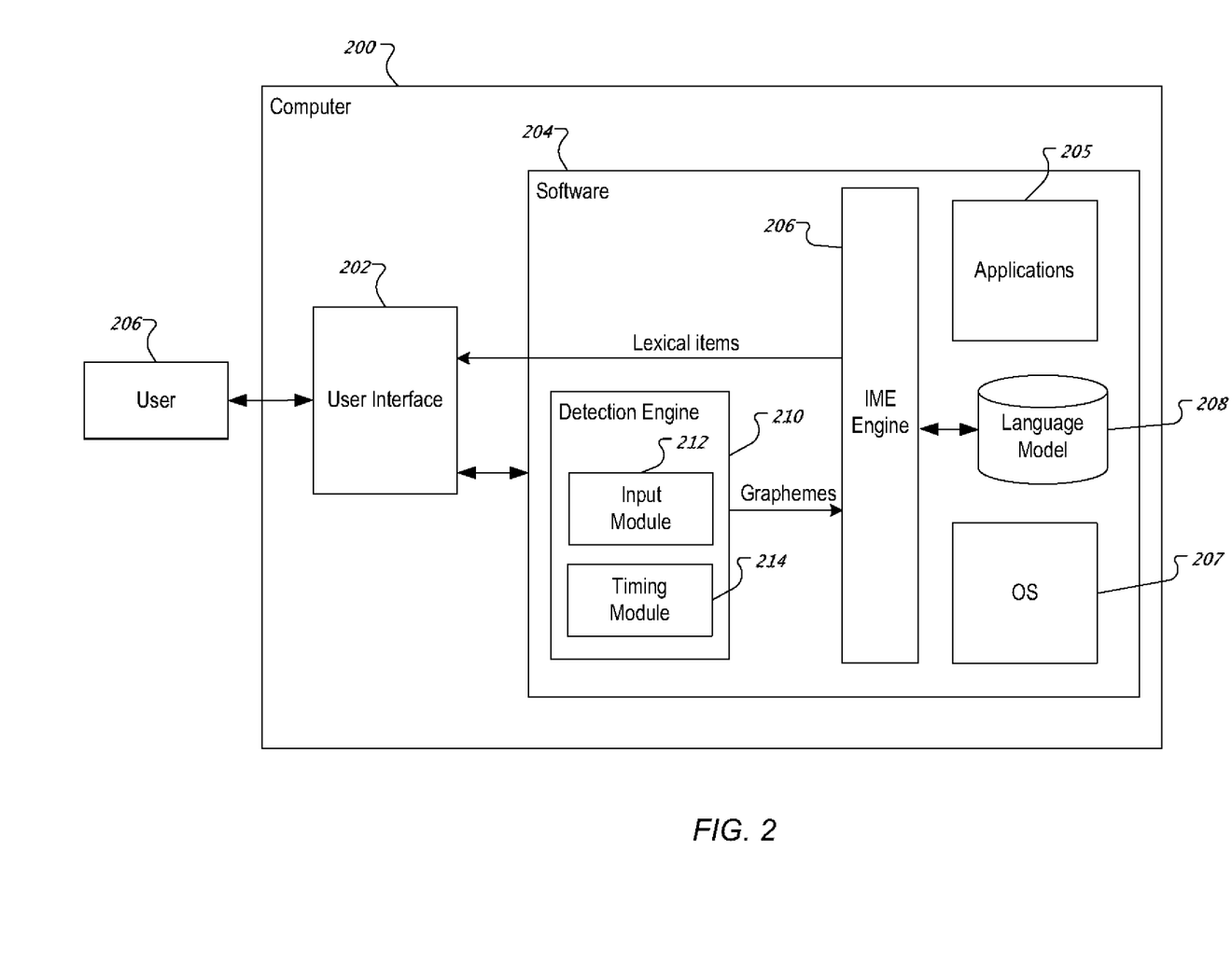
FIG. 2 includes a block diagram of example software that can be utilized to implement an input method editor in FIG. 1.

FIG. 2 includes a block diagram of example software that can be utilized to implement an input method editor in FIG. 1 (e.g., IMEI 103). The system 200 includes a user interface 202 and software 204. A user 206 can access system 200 through the user interface 202. The software 204 includes applications 205, IME engine 206, an operating system (OS) 207, a language model 208, and a detection engine 210. The operating system 207 is a particular piece of software that can provide the user interface 202 between the software 204 (e.g., applications 205 and IME engine 206) and the user 206.

As shown in FIG. 2, the language model 208 is separate from IME engine 206. In particular, the language model 208 is included within software 204 as a separate software component. Other implementations are possible. For example, the language model 208 can be located remotely (e.g., at the remote system 118 of FIG. 1). As another example, the language model 208 can be included within the IME engine 206.

The language model 208 can define one or more language sub-models, e.g., a Japanese language sub-model, a Chinese language sub-model, etc. Each language sub-model can, for example, define a particular rule set, e.g., grammar particular to a language, phrase sets, verbals, etc., that can be used to determine a user's likely intent in entering a set of inputs (e.g., inputs for generating candidates that are translations, transliterations, or other types of phonetic representations). Each language sub-model can also include a user history of a particular user, e.g., a dictionary of words and phrased often used by a particular user.

The detection engine 210 includes an input module 212 and a timing module 214. The input module 212 can, for example, receive input (e.g., keystrokes representing characters in a first writing system) to particular applications 205 and send the received input to the IME engine 206. In some implementations, the detection engine 210 is a component of the IME engine 206.

The detection engine 210 can detect input in a first writing system (e.g., Pinyin input including Roman characters) and determine whether or not to send the input to the IME engine 206. The IME engine 206 can, for example, be implemented using the input method editor code 101 and associated data stores 104 and 106, and provide output candidates in a second writing system (e.g., lexical items such as Hanzi terms) to an interface (e.g., user interface 202) as the input (e.g., graphemes such as Roman characters) is detected, as described with reference to FIGS. 3 through 6 below.

The components of system 200 can be communicatively coupled to one or more of each other. Though the components identified above are described as being separate or distinct, one or more of the components may be combined in a single process or routine. The functional description provided herein including separation of responsibility for distinct functions is by way of example. Other storage architectures can also be used. In particular, other groupings or other divisions of functional responsibilities can be made as necessary or in accordance with design preferences. For example, IME engine 206 could perform the functions of detection engine 210. As another example, input module 212 and timing module 214 could be combined into a single module.

Figure 3:
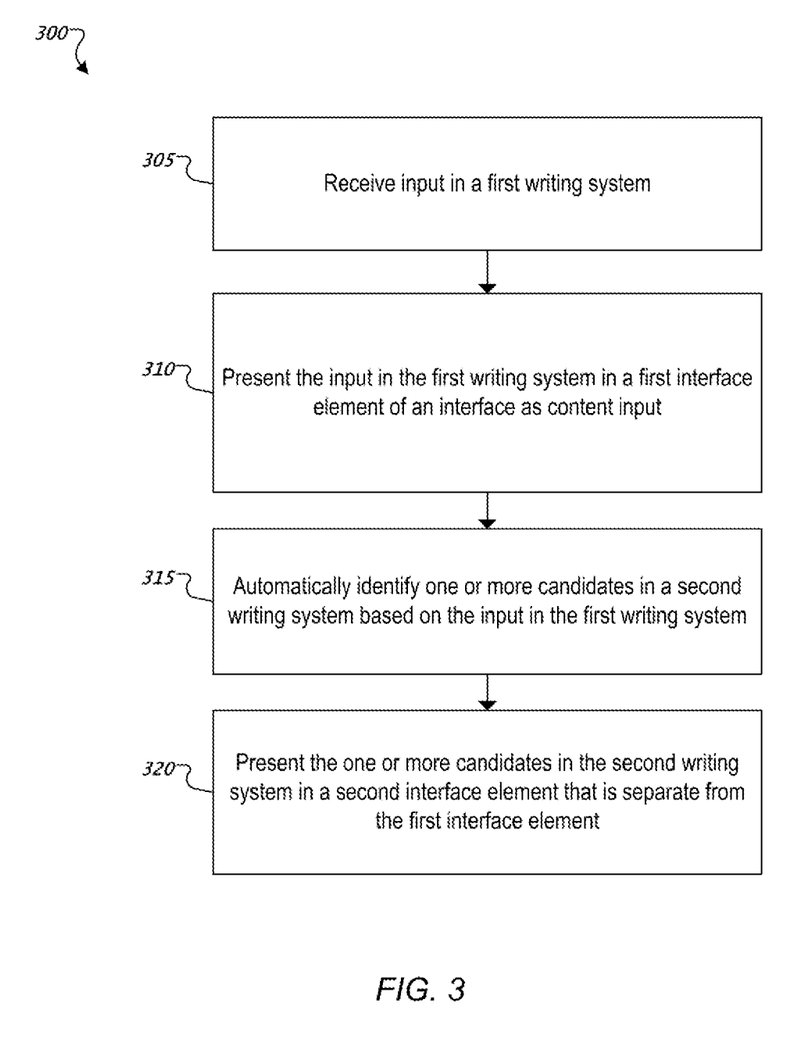
FIG. 3 is a flow chart showing an example process for generating output text candidates in a second writing system based on text input in a first writing system.

FIG. 3 is a flow chart showing an example process 300 for generating output text candidates in a second writing system based on text input in a first writing system. As an overview, the process 300 includes receiving input in a first writing system (305), presenting the input in the first writing system in a first interface element of an interface as content input (310), automatically identifying one or more candidates in a second writing system based on the input in the first writing system (315), and presenting the one or more candidates in the second writing system in a second interface element that is separate from the first interface element (320). The process 300 can be explained by way of example with reference to FIGS. 4A-4C.

Figure 4A:
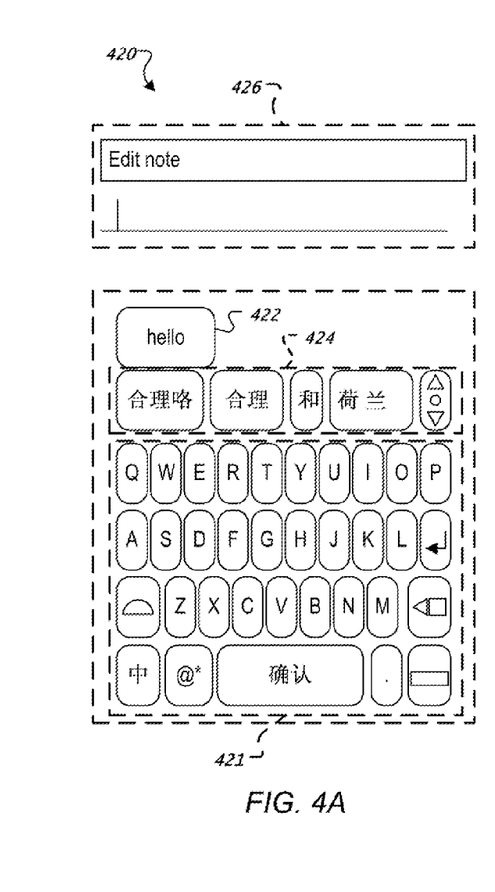
FIGS. 4A-4C show example input method editor interfaces.
Figure 4B:
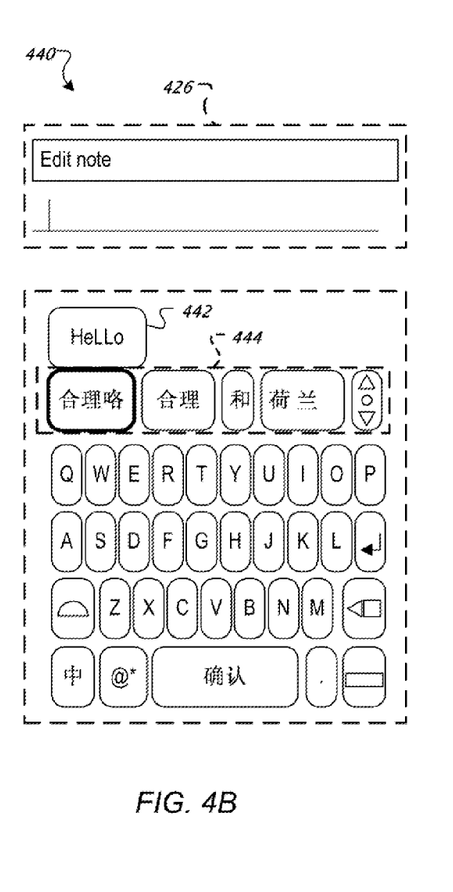
Figure 4C:
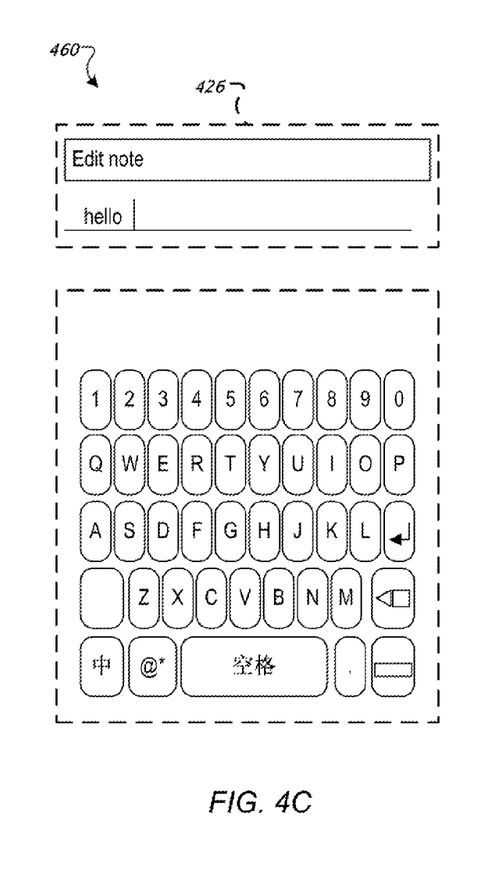

FIGS. 4A-4C show example input method editor interfaces 420, 440, and 460. An IME interface can include a first interface element (e.g., a composing box) for providing input in a first writing system, and a second interface element (e.g., a candidate window) for displaying output candidates in a second writing system.

As shown in FIG. 4A, IME interface 420 also includes a virtual input device 421 (e.g., a virtual representation of a keyboard). In the example, the keyboard includes keys that correspond to Roman characters, and a user can provide input in a first writing system, e.g., a sequence of Roman characters "hello". In addition, the keyboard includes a key labeled "空格" (e.g., "space" in English), allowing the user to input spaces as input.

Upon receiving input in the first writing system (e.g., step 305), e.g., as detected by the detection engine 210, an input method editor (e.g., IME engine 206) can present the input in the first writing system in a first interface element of an interface as content input (e.g., step 310). The first interface element can be considered a default interface element because the input originally provided by the user and detected by the system can, by default, be presented in the first interface element. As shown in FIG. 4A, the sequence of Roman characters "hello" is presented in the first interface element 422.

Furthermore, a default entry command of a first interface element copies the input into a target location of an interface (e.g., a graphical user interface). For example, on a device that includes a touch-sensitive display, the default entry command can be a gesture that indicates a selection of the first interface element 422. In particular, a user could "touch" the first interface element 422, and the content input in the first interface element 422 can be copied to a target location 426 (e.g., a text entry box for an application 205), as shown in FIG. 4C. Other implementations are possible. For example, the default entry command can be received as input through a physical button or key on a user device (e.g., mobile phone). In some implementations, the default entry command can be a selection of another object or element in an IME interface, as will be shown in FIG. 4B.

As the user input is received and detected by the detection engine 210, for example, the input method editor (e.g., IME engine 206) can automatically identify one or more candidates in a second writing system (e.g., Hanzi) based on the input in the first writing system (e.g., the sequence of Roman characters that may represent Pinyin) (e.g., step 315). Referring to FIG. 4B, the input module 212 of detection engine 210 in FIG. 2 can detect "hello" and send "hello" to IME engine 206. IME engine 206 can use language model 208 to identify one or more candidates (e.g., lexical items) in a second writing system that is different from the first writing system, based on the graphemes "h", "e", "l", "l", "o" that the input includes.

The one or more candidates in the second writing system can be presented in a second interface element that is separate from the first interface element (e.g., step 320). In FIG. 4A, Hanzi terms are presented in the second interface element 424. In FIG. 4B, Hanzi terms are presented in the second interface element 444. Although the one or more candidates in the second writing system are displayed in the second interface element, the content input in the first writing system can still be copied into the target location in the interface in response to a default entry command. In some implementations, the presentation of the virtual keyboard 421 can be modified such that a key corresponding to the default entry command is displayed. For example, the space key labeled "空格" in FIG. 4C is remapped to a different command in FIG. 4A and FIG. 4B, i.e., "确认" (e.g., "confirm" in English). The default entry command can correspond to a selection of the confirm command when a candidate in the second writing system has not yet been selected, as shown in FIG. 4A.

Referring to FIG. 4A, in some implementations, an indicator can be presented in the first interface element 422 that indicates whether the content input in the first writing system or a candidate in the second writing system will be copied to the target location 426 in response to the default entry command. For example, the indicator in the first interface element 422 shows the content input "hello", indicating that selection of the confirm key will copy the content input in the first writing system (i.e., "hello") into the target location 426.

Alternatively, a user may want to copy a candidate in the second writing system into the target location 426. In FIG. 4B, the indicator in the first interface element 442 shows a different representation of the content input (i.e., "HeLLo"), and indicates that selection of the confirm key (labeled "确认") will copy one of the one or more candidates in the second writing system into the target location 426. In particular, the different representation of the content input "HeLLo" can be used to show segmentations of the input in the first writing system that were used to generate the one or more candidates in the second writing system. For example, "He" corresponds to "合" ("hé" in Pinyin), "L" corresponds to "理" ("li" in Pinyin), and "Lo" corresponds to "咯" ("lo" in Pinyin). Other implementations are possible. For example, indicators can show an identifier that identifies a particular writing system or language (e.g., "Hanzi", "Chinese", "English").

The candidate in the second writing system can be copied into the target location subsequent to a corresponding selection of one of the one or more candidates in the second interface element 444. For example, in a touch-sensitive display, the user can touch a first candidate (e.g., "合理咯") in the second interface element 444.

In some implementations, one of the one or more candidates in the second writing system can be selected by default. For example, in FIG. 4B, highlighting of candidate "合理咯" can indicate that it has been selected by default. The default selection can be identified based on one or more criteria. For example, the most likely candidate to occur in training data can be identified as the default selection. In these and other implementations, a user can select the "确认" ("confirm") key to copy an indicated selection to the target location. A user can also navigate among the one or more candidates in the second writing system by using, for example, a physical input device (e.g., a scroll wheel). Highlighting or other indications (e.g., shading, flashing, magnification) can be used to indicate a selection of one of the one or more candidates in the second writing system.

In some implementations, the input method editor can automatically identify whether input is content input in a first writing system or if the input is symbolic input, i.e., representative of content input in a second writing system. The identification can be considered automatic because the input method editor can identify that a single input is content input or symbolic input from the single input only and without further user input or interaction.

Figure 5:
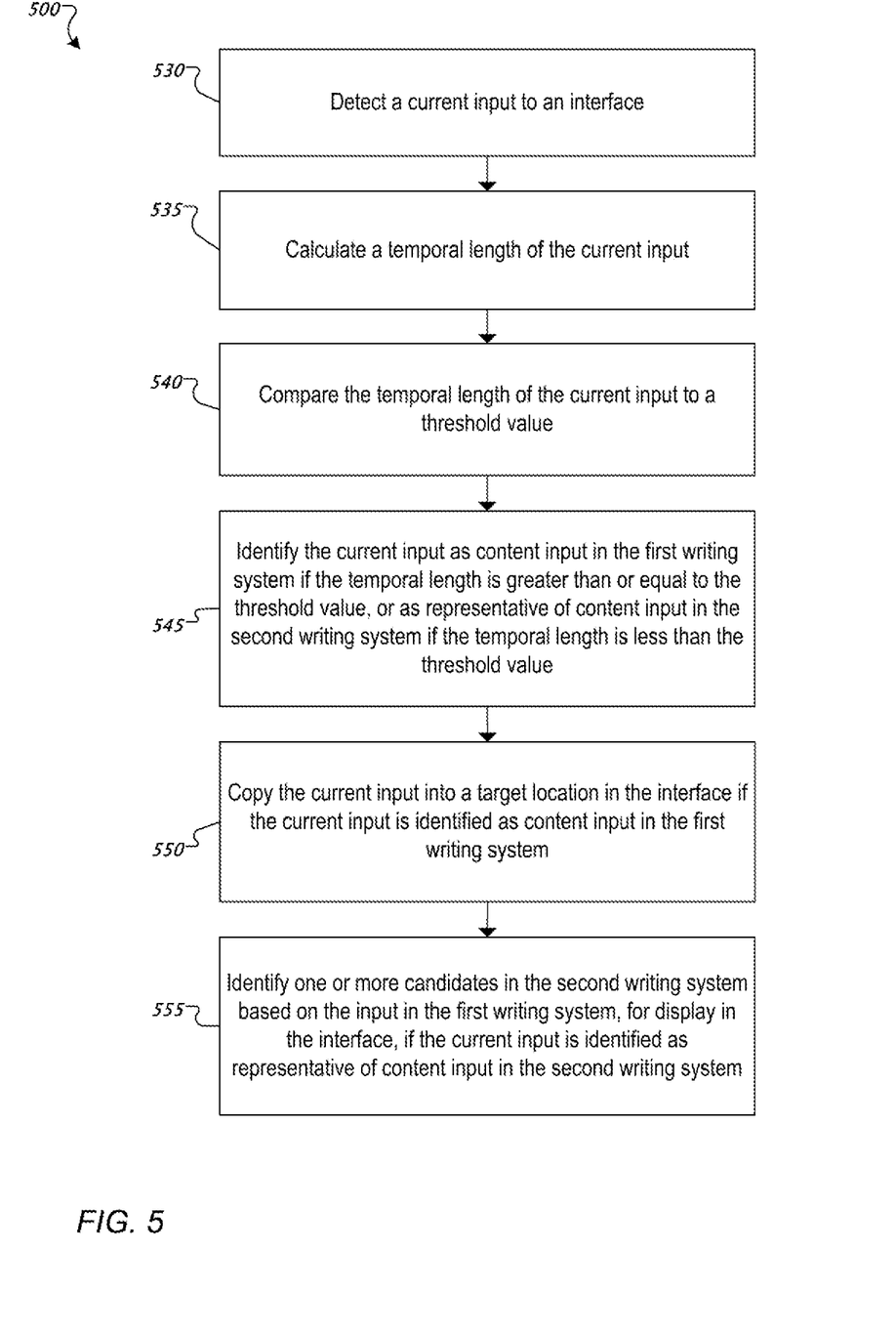
FIG. 5 is a flow chart showing another example process for generating output text candidates in a second writing system based on text input in a first writing system.

FIG. 5 is a flow chart showing another example process 500 for generating output text candidates in a second writing system based on text input in a first writing system. As an overview, the process 500 includes detecting a current input to an interface (530), calculating a temporal length of the current input (535), and comparing the temporal length of the current input to a threshold value (540). The process 500 also includes identifying the current input as content input in the first writing system if the temporal length is greater than or equal to the threshold value, or as representative of content input in the second writing system if the temporal length is less than the threshold value (545). If the current input is identified as content input in the first writing system, the current input is copied into a target location in the interface (550). If the current input is identified as representative of content input in the second writing system, one or more candidates in the second writing system are identified based on the current input in the first writing system, for display in the interface (555). The process 500 can be explained by way of example with reference to FIG. 6.

Figure 6:
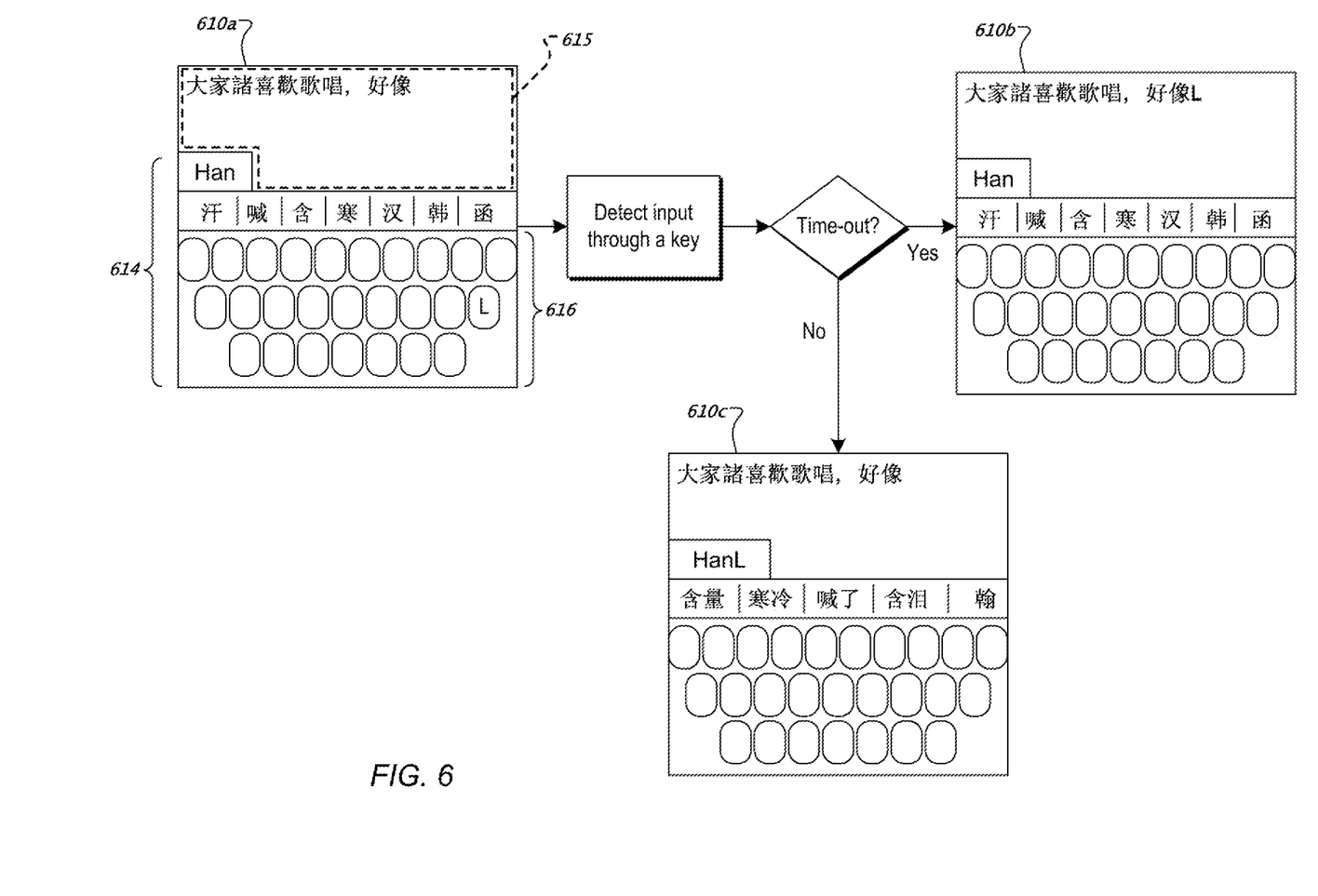
FIG. 6 illustrates example steps for identifying input as content input in a first writing system or as representative of content input in a second writing system.

FIG. 6 illustrates example steps for identifying input as content input in a first writing system or as representative of content input in a second writing system. Interface 610*a* (e.g., a graphical user interface) includes an IME interface 614 and a target location 615 for text entry. The IME interface 614 includes an indicator (e.g., like in the first interface element 442) that shows previous input, e.g., input already received by the IME, consisting of the sequence of characters "Han". The IME interface 614 also includes a virtual keyboard 616. The virtual keyboard 616 shows that current input has been received through actuation of an input device (i.e., the virtual keyboard 616), and in particular, actuation of a key that maps to input for the Roman character "L" as shown by highlighting of the key.

The input module 212 of detection engine 210 can detect the current input to interface 610*a* (e.g., step 530). Timing module 214 can calculate a temporal length of the current input (e.g., step 535). The temporal length represents a duration of actuation of the input device. For example, the temporal length can be a number of seconds that a key is actuated (e.g., pressed or tapped). The detection engine 210 can compare the temporal length of the input to a threshold value (e.g., step 540). The threshold value can be a predetermined amount of time (e.g., two seconds). In some implementations, the threshold value can be an predetermined amount of time that is configured based on a user's previous input or habits. For example, if a user actuates an input device for one second on average for each input, the threshold value can be set to one second. In addition, the threshold value can also be configured according to a user's preferences, e.g., the user can set the threshold value to three seconds.

The detection engine 210 can determine whether the current input is content input in the first writing system or representative of content input in the second writing system based on the comparison of the temporal length to the threshold value. If the temporal length is greater than or equal to the threshold value, the detection engine 210 can identify the current input as content input in the first writing system (e.g., an explicit Roman character) (e.g., step 545). Referring to FIG. 6, if the temporal length is greater than or equal to the threshold value (e.g., resulting in a time-out), the explicit Roman character "L" is copied into the target location of interface 610*b* (e.g., step 550). Note that the one or more candidates in the second writing system shown in the interface element in interface 610*b* have not changed in response to the current input.

If the temporal length is less than the threshold value (e.g., no time-out), the detection engine 210 can identify the current input as representative of content input in the second writing system (e.g., step 545). As shown in interface 610*c*, the current input is identified as representative of Pinyin. In addition, one or more candidates in the second writing system (e.g., Hanzi terms) are identified based on the current input in the first writing system, for display in the interface (e.g., step 555). As shown in interface 610*c*, the indicator now displays the Pinyin input "HanL", and candidates in the second writing system that may be represented by "HanL" are presented in the interface element.

In particular, the candidates shown in interface 610*c* can be different from the candidates shown in interface 610*a*, because the candidates in 610*c* are generated based on "HanL", which includes the current input "L" and previous input representative of content input in the second writing system (i.e., "Han"). For example, the interface 610*a* shows a Pinyin input "Han" and a Hanzi candidate "汗" ("hàn" in Pinyin). The interface 610*c* shows a Pinyin input "HanL", which can be representative of two Pinyin syllables (e.g., "含量", which is "hán liàng" in Pinyin).

Other implementations are possible. For example, if the detection engine 210 identifies input as representative of content input in the second writing system a predetermined number of times (e.g., three times), the detection engine 210 can, by default, consider a next input to be representative of content input in the second writing system and send the next input to the IME engine 206. In addition, a second threshold value (e.g., that is greater than the first threshold value) can be used to identify that additional input is content input in the first writing system, or another predetermined command can be used to prevent the detection engine 210 from considering additional input to be representative of content input in the second writing system by default.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus (e.g., processing device 102). The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
   receiving input in a first writing system;
   presenting the input in the first writing system in a first interface element of an interface as content input, wherein the first interface element is a default interface element for presenting the input and a default entry command of the first interface element copies the input into a target location in the interface;
   calculating a temporal length of the input, the temporal length representing a duration of actuation of an input device corresponding to the input;
   comparing the temporal length of the input to a threshold value;
   when the temporal length of the input is greater than or equal to the threshold value, identifying the input as representative of content input in the first writing system;
   when the temporal length of the input is less than the threshold value, identifying the input as representative of content input in a second writing system; and
   when the input is identified as content input in the second writing system:
      identifying one or more candidates in the second writing system based on the input in the first writing system; and
      presenting the one or more candidates in the second writing system in a second interface element that is separate from the first interface element, wherein a first candidate in the second writing system is copied into the target location subsequent to a corresponding selection of one of the one or more candidates in the second interface element.

2. The method of claim 1, wherein the corresponding selection is a user selection of the first candidate.

3. The method of claim 1, wherein the one or more candidates in the second writing system comprise translations, transliterations, or phonetic representations of the input in the first writing system.

4. The method of claim 1, wherein the first writing system is Pinyin and the second writing system is Hanzi.

5. A computer-implemented method, comprising:
- detecting a current input to an interface;
- calculating a temporal length of the current input, the temporal length representing a duration of actuation of an input device corresponding to the current input;
- comparing the temporal length of the current input to a threshold value;
- identifying the current input as content input in a first writing system if the temporal length is greater than or equal to the threshold value, or as representative of content input in a second writing system if the temporal length is less than the threshold value;
- copying the current input into a target location in the interface, if the current input is identified as content input in the first writing system; and
- identifying one or more candidates in the second writing system based on the current input in the first writing system, for display in the interface, if the current input is identified as representative of content input in the second writing system.

6. The method of claim 5, wherein identifying one or more candidates in the second writing system includes:
- generating the one or more candidates in the second writing system based on the current input and previous input representative of content input in the second writing system.

7. The method of claim 5, wherein the current input is received through a virtual input device.

8. The method of claim 5, wherein the first writing system is Pinyin and the second writing system is Hanzi.

9. A system, comprising:
- a data processing apparatus; and
- a data store, in which is stored:
  - a detection engine including:
    - an input module that detects input received through an interface of the data processing apparatus, wherein the input is in a first writing system, and
    - a timing module that calculates a temporal length of the input, the temporal length representing a duration of actuation of an input device corresponding to the input,
  - wherein the detection engine identifies the input as content input in the first writing system when the temporal length of the input is greater than or equal to a threshold value and identifies the input as content input in a second writing system when the temporal length of the input is less than the threshold value; and
  - an input method editor that:
    - presents the input in the first writing system in a first interface element of the interface as content input, and
    - when the input is identified as content input in the second writing system, identifies one or more candidates in a second writing system, based on the input in the first writing system, for display in a second interface element that is separate from the first interface element.

10. The system of claim 9, wherein the first interface element is a default interface element for presenting the input and a default entry command of the first interface element copies the input into a target location in the interface, and a first candidate in the second writing system is copied into the target location subsequent to a corresponding selection of one of the one or more candidates in the second interface element.

11. The system of claim 9, wherein the first writing system is Pinyin and the second writing system is Hanzi.

12. A system comprising:
- a data processing apparatus; and
- a data store, in which is stored:
  - a detection engine including:
    - an input module that detects input received through an interface of the data processing apparatus, wherein the input is in a first writing system, and
    - a timing module that calculates a temporal length of the input, the temporal length representing a duration of actuation of an input device corresponding to the input; and
- an input method editor that identifies the input as content input in the first writing system if the temporal length is greater than or equal to a threshold value, or as representative of content input in a second writing system if the temporal length is less than the threshold value, for display in a target location in the interface.

13. The system of claim 12, wherein the data store further stores:
- a language model that identifies one or more candidates in the second writing system based on the input in the first writing system, for display in the target location, if the input is identified as representative of content input in the second writing system.

14. The system of claim 12, wherein the first writing system is Pinyin and the second writing system is Hanzi.

15. The method of claim 1, wherein the temporal length of the input represents a duration of actuation of a specific key of the input device.

16. The method of claim 5, wherein the temporal length of the input represents a duration of actuation of a specific key of the input device.

17. The method of claim 5, wherein the threshold value is configured based on the user's previous input or habits.

18. The system of claim 9, wherein the temporal length of the input represents a duration of actuation of a specific key of the input device.

19. The system of claim 12, wherein the temporal length of the input represents a duration of actuation of a specific key of the input device.

20. The system of claim 12, wherein the threshold value is configured based on the user's previous input or habits.

* * * * *